(12) United States Patent
Sanders et al.

(10) Patent No.: US 9,539,164 B2
(45) Date of Patent: Jan. 10, 2017

(54) SYSTEM FOR INDOOR GUIDANCE WITH MOBILITY ASSISTANCE

(75) Inventors: Aaron D. Sanders, Rochester, NY (US); Kasey C. Hopper, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 400 days.

(21) Appl. No.: 13/424,510

(22) Filed: Mar. 20, 2012

(65) Prior Publication Data

US 2013/0253818 A1    Sep. 26, 2013

(51) Int. Cl.
*A61H 3/06*     (2006.01)
*G01C 21/20*    (2006.01)
*G01S 5/02*     (2010.01)

(52) U.S. Cl.
CPC ............. *A61H 3/061* (2013.01); *G01C 21/206* (2013.01); *G01S 5/0236* (2013.01); *A61H 2003/063* (2013.01)

(58) Field of Classification Search
CPC ....... G01C 21/34; G01C 21/206; A61H 3/061; G01S 5/0236
USPC ....................................................... 701/434
See application file for complete search history.

(56) References Cited

U.S. PATENT DOCUMENTS

| | | | |
|---|---|---|---|
| 3,718,896 A | 2/1973 | Mowat | |
| 4,660,022 A | 4/1987 | Osaka | |
| 4,712,003 A | 12/1987 | Ban et al. | |
| 5,487,669 A | 1/1996 | Kelk | |
| 5,806,017 A | 9/1998 | Hancock | |
| 6,032,004 A | 2/2000 | Mirabella, Jr. et al. | |
| 6,298,010 B1 | 10/2001 | Ritz et al. | |
| 6,489,605 B1 | 12/2002 | Ritz et al. | |
| 6,710,706 B1 | 3/2004 | Withington et al. | |
| 6,725,051 B2 | 4/2004 | Fidler | |
| 6,922,634 B2 | 7/2005 | Odakura et al. | |
| 7,027,820 B2 | 4/2006 | Spratt | |
| 7,267,281 B2 | 9/2007 | Hopkins | |
| 7,408,465 B2 | 8/2008 | Boss et al. | |
| 7,439,848 B2 | 10/2008 | Mantri | |
| 7,916,661 B2 | 3/2011 | Alizadeh-Shabdiz et al. | |
| 2004/0204831 A1 | 10/2004 | Pochuev et al. | |
| 2006/0120601 A1 | 6/2006 | Dietsch et al. | |
| 2008/0051992 A1* | 2/2008 | Yamada ........................ 701/209 |

(Continued)

FOREIGN PATENT DOCUMENTS

EP     2177928 A1    4/2010
JP     2008033043    2/2008

OTHER PUBLICATIONS

IPCOM000135309D dated Apr. 10, 2006, http://ip.com/IPCOM/000135309, abstract.

(Continued)

*Primary Examiner* — Basil T Jos
(74) *Attorney, Agent, or Firm* — Gibb & Riley, LLC (57) ABSTRACT

An indoor guidance system for a blind or visually impaired person. The system uses a mobile device (Smartphone, tablet, etc.) to provide maps and visual and voice guidance to assist individuals in navigating through indoor locations. Special maps are transmitted to the mobile device upon entering the facility, or downloaded in advance. The software and maps provide assistance to the user, to guide them through the facility. The system uses a combination of GPS and other technologies (Bluetooth, infrared, Wi-Fi, RFID, etc.) to provide extremely detailed and accurate location information to the user.

20 Claims, 4 Drawing Sheets

(56) References Cited

U.S. PATENT DOCUMENTS

| | | |
|---|---|---|
| 2008/0082258 A1* | 4/2008 | Pham et al. .................. 701/206 |
| 2008/0280265 A1 | 11/2008 | Lopez-Jaime |
| 2009/0046005 A1 | 2/2009 | Namineni et al. |
| 2009/0213009 A1 | 8/2009 | Ishiwatari et al. |
| 2009/0322603 A1 | 12/2009 | Liao |
| 2010/0039929 A1 | 2/2010 | Cho et al. |
| 2010/0103980 A1* | 4/2010 | Smith et al. .................. 375/131 |
| 2010/0121488 A1 | 5/2010 | Lee et al. |
| 2010/0259450 A1 | 10/2010 | Kainulainen et al. |
| 2011/0018732 A1 | 1/2011 | Cho et al. |
| 2011/0047053 A1 | 2/2011 | Kim et al. |
| 2011/0090124 A1 | 4/2011 | Liu et al. |
| 2011/0106445 A1* | 5/2011 | Mayer et al. .................. 701/209 |
| 2013/0035109 A1* | 2/2013 | Tsuruya .................. G01S 5/0252 455/456.1 |

OTHER PUBLICATIONS http://www.engadget.com/2011/05/25/kddis-swing-navigation-system-helps-you-find-your-way-around-a/, May 25, 2011. pp. 1-4.
http://www.engadget.com/2011/03/22/navteqs-destination-maps-provide-mobile-guidance-through-malls/, Mar. 22, 2011, pp. 1-4.
http://www.engadget.com/2011/07/11/bing-indoor-maps-and-visual-voicemail-shown-in-latest-wp7-mango/, Jul. 11, 2011, pp. 1-5.

\* cited by examiner

SYSTEM FOR INDOOR GUIDANCE WITH MOBILITY ASSISTANCE

BACKGROUND

Embodiments herein generally relate to guidance systems and more particularly to indoor guidance systems for the visually impaired, and to systems and methods for supplying a user with guidance based on knowledge of features of the indoor surroundings and dependent upon the location.

Over one million people in the United States and several million more people worldwide are legally blind. Even more people suffer from low or reduced vision. For this large population, simple daily tasks such as traveling, leaving the house to attend social events, or simply running errands, can be quite daunting tasks. The vision aids that have been developed in the past are large and bulky, and have drawn attention to the fact that the user has a visual impairment.

Guidance systems are known, but are generally not designed for the visually impaired. Likewise interfaces for the visually impaired are known, but have not been applied to indoor guidance.

Indoor mapping and guidance is the newest innovation in assistive technologies, providing electronic maps and guidance for large facilities, such as shopping malls or department stores. These existing systems are in their infancy, and lack many beneficial features. Additionally, they do not provide specific assistance for individuals who are blind or visually impaired, which is one of the main goals of the system discussed herein.

Positioning techniques using a wireless communication infrastructure vary depending on the types of infrastructure and service coverage. A satellite-based global positioning system (GPS) has a problem in that the sensitivity of a reception signal is degraded in an indoor area, such that it fails to acquire a signal, so it is not possible to determine a location. A cellular-based positioning technique for determining the location of a user by using location information and a measurement signal of a mobile communication base station has an advantage of allowing determination of a location even in an indoor area, as well as in an outdoor area, but its positioning accuracy varies depending on the disposition density of base stations and it has a relatively low location accuracy. A wireless local area network based positioning technique is a typical method for resolving the difficulties of indoor positioning. Such technique calculates the location of a terminal by using a reference location of an access point and a measurement signal.

There remains a need for a new and useful handheld system that avoids or minimizes the disadvantages of past navigation aids. This invention provides such a new and useful handheld aid.

SUMMARY

The system disclosed herein describes an indoor guidance system. The system uses a mobile device (Smartphone, tablet, etc.) to provide maps and visual and voice guidance to assist individuals in navigating through indoor locations. Special maps are transmitted to the mobile device upon entering the facility, or downloaded in advance. The software and maps provide assistance to the user, to guide them through the facility. The system uses a combination of GPS and other technologies (Bluetooth, infrared, Wi-Fi, RFID, etc.) to provide extremely detailed and accurate location information to the user.

According to one embodiment herein, a system for aiding a user to navigate within a facility is disclosed. The system comprises a hand-held device carried by the user that, upon activation by the user, downloads an electronic map of the facility and produces direction signals. The electronic map comprises a layout of the facility and includes key areas. At least one dedicated wireless transceiver is disposed in each key area of the facility and the transceiver interacts only with the hand-held device. A processor is operatively coupled to the hand-held device. The processor establishes a current physical location of the user with respect to the electronic map. The processor receives from the user a destination location within the facility and provides to the user output signals and directions to the destination location within the facility. As the user moves through the facility, the processor receives, from the at least one dedicated wireless transceiver, a plurality of signals to determine the user's current physical location within the facility. The processor processes each individual current physical location reading to refine the current physical location of the user's location in the facility with respect to the electronic map.

According to another embodiment herein, a handheld system for aiding a visually impaired user to navigate within a building is disclosed. The handheld system comprises a housing. A position detector is connected to the housing and provides data of a user's location within the building. The position detector receives signals from at least one dedicated wireless transceiver that interacts only with the position detector within the building. A direction detector provides data of the user's direction of motion. An input receiver receives a destination within the building as determined by the user. A processor is coupled to the position detector and the direction detector and the processor correlates the position and direction data with information of features of the building as stored as an electronic map in a memory in the housing. The processor establishes a physical location of the user in the building. An output device provides directions to the user.

According to another embodiment herein, a method of providing assistance to users in navigating indoor locations is disclosed. The method comprises using a handheld device having a wireless positioning system to establish a current physical location of a user with respect to a map of an indoor location stored within the handheld device. A destination location within the indoor location selected by the user is received by the handheld device. Output signals and directions to the destination location within the indoor location are provided to the user. As the user moves through the indoor location, the wireless positioning system receives signals from at least one dedicated wireless transceiver that interacts only with the hand-held device within the indoor location to determine the user's current physical location within the indoor location. Then, each individual current physical location reading is processed to refine the current physical location of the user's location in the indoor location with respect to the electronic map.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Embodiments herein use a combination of wireless sensors (Bluetooth, Infrared, Wi-Fi, GPS, etc.) in combination with electronic maps to provide assistance to users for navigating indoor locations. This is an advantage over current systems that use either static maps, or proprietary sensors. By nature this system is designed to be flexible and to leverage existing technologies. For users with no disability, the embodiments provide a useful way to navigate unfamiliar areas, such as large department stores or shopping malls. For users with visual impairment, the system provides assistive technology that can give the user improved life experiences and self-sufficiency.

The system comprises a hand-held device carried by the user that, upon activation by the user, downloads an electronic map of the facility and produces direction signals. The electronic map comprises a layout of the facility and includes key areas. At least one dedicated wireless transceiver is disposed in each key area of the facility and the transceiver interacts only with the hand-held device. A processor is operatively coupled to the hand-held device. The processor establishes a current physical location of the user with respect to the electronic map. The processor receives from the user a destination location within the facility and provides to the user output signals and directions to the destination location within the facility. As the user moves through the facility, the processor receives, from the at least one dedicated wireless transceiver, a plurality of signals to determine the user's current physical location within the facility. The processor processes each individual current physical location reading to refine the current physical location of the user's location in the facility with respect to the electronic map.

Figure 1:
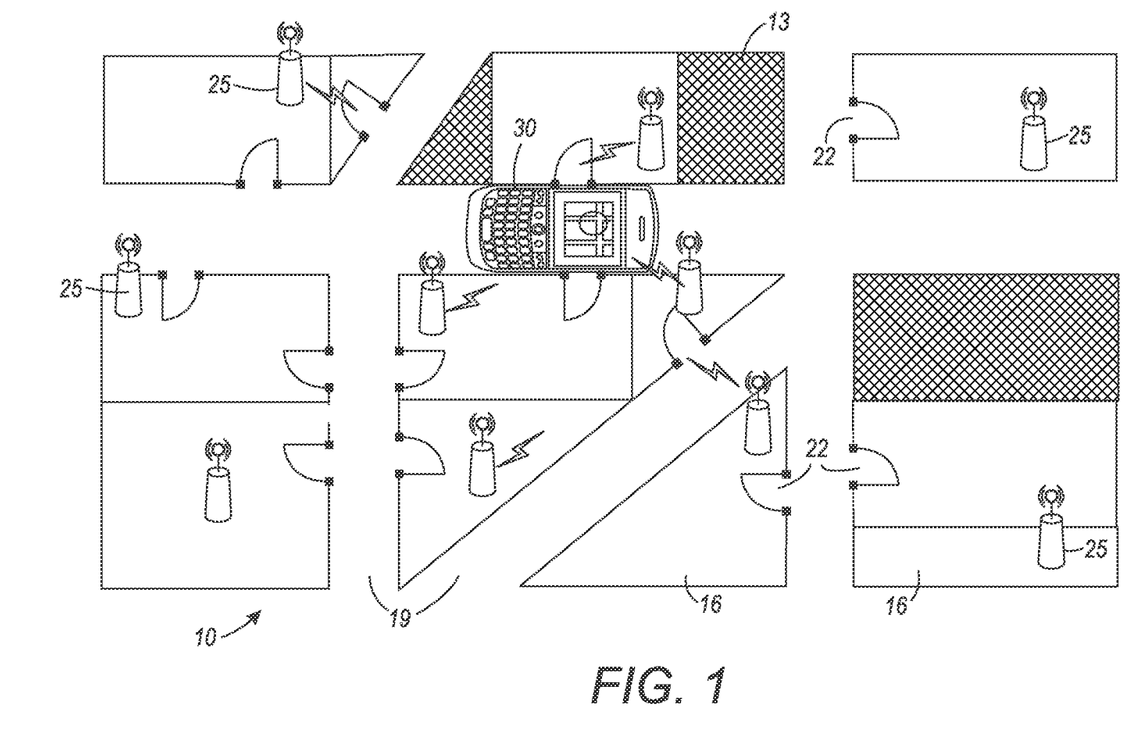
FIG. 1 is a schematic diagram of a system according to embodiments herein.

Referring to FIG. 1, first, an indoor environment 10 is analyzed and a detailed electronic map 13 of the indoor environment 10 is generated. The electronic map 13 should include key areas 16 and features of the indoor environment 10, such as walkways 19, doors 22, rooms, stairways, and elevators, as well as other features, such as dangerous/hazardous areas, bathrooms, and reception or information areas. Consider a multiplex movie theater as an example. The following steps may be performed:

Key areas 16 may be determined to be the ticket booth, concessions counter, the ticket taker station, restrooms, auditorium, and exits. In some embodiments, every seat in every auditorium may also be a key area 16.

Wireless sensors 25 are placed in each key area 16. Additional wireless sensors may be required depending on the size of the indoor environment 10 and chosen technology —additional sensors 25 may be required for proper coverage of the entire indoor environment 10.

An electronic map 13 is generated with a layout of the facility, including each key area 16. The electronic map 13 includes information regarding physical size and distances in the facility.

New sensors 25 can be added and new electronic maps 13 can be created, as necessary, to support layout changes or new key areas 16.

In some embodiments, the sensors 25 may use radio-frequency electromagnetic fields to transfer data from the sensors 25 to a mobile handheld device 30, for the purposes of automatic location tracking. Some sensors 25 require no battery and are powered by the electromagnetic fields used to read them. Others use a local power source and emit electromagnetic radiation at radio frequencies that can be received by the mobile handheld device 30. The sensors 25 contain electronically stored information that can be read from up to several feet away.

A user obtains the electronic map 13 of the facility on the mobile handheld device 30. The electronic map 13 could be available on the Internet for advance download, or may be downloaded to the mobile handheld device 30 once the user nears the facility. The maps should be designed to integrate with existing mapping software, such as Google Maps or Microsoft Bing. Additionally, the maps should also support integrations with current products for the blind/visually impaired including Digit-Eyes, VoiceOver, and The vOICe. The user could obtain the electronic map 13 by opening the mapping software, and accepting the transmitted electronic map 13. Continuing the multiplex movie theater example, the user could then follow this general process:

The user could interact with the electronic map 13 in a variety of ways to find their desired location. For example, the user could tap an icon representing the ticket booth on the mobile handheld device 30 or speak "ticket booth." In some embodiments, the user could tap or say "listing" to get a listing of all of the key areas 16 included on the electronic map 13. The user interface components supports multiple forms of user input, i.e. "for guidance to the concession stand, tap the screen once or say 'concessions', for guidance to the ticket taker, tap the screen twice or say 'ticket taker' ."

Once the user has indicated their desired destination (and confirmed that the software is targeting the correct destination), a processor executing appropriate software in the mobile handheld device 30 would guide the user to the desired location. The sensors 25 placed in the key areas 16 enable the processor to determine whether the user is walking in the correct direction, and it can respond using visual cues, or with audible responses, such as "the concession stand is 35 feet to your right" or "approaching destination concession stand." In some embodiments, the mobile handheld device 30 may provide tactile response, such as the device could make different vibration combinations to signal different types of feedback. The processor could also correct the user, using appropriate audible responses, such as "you are heading in the wrong direction" or "walk 15 feet to your right." In some embodiments, the user may configure the software on their mobile handheld device 30 with their normal stride, so feedback could be provided in the number of paces, as opposed to feet or meters.

As mentioned above, in some embodiments, every seat in every auditorium may be a key area 16. Accordingly, in some embodiments, one or more sensors 25 could be placed in every seat in every auditorium, allowing people to find not only the correct auditorium, but also a specific object, such as finding a free seat in a darkened auditorium. This would benefit both sighted and visually impaired users. Other similar applications may be directed to finding a free seat on a bus, finding the correct seat at a sporting or musical event, amusement park, etc.

It is further contemplated that the technology described herein may be incorporated into augmented reality imagery for use in head-mounted displays or hand-held devices. The physical location information can be augmented in real-time context with environmental elements by computer-generated sensory input such as sound, video, or graphics.

The disclosure herein uses an example of a movie theater; however, the mapping opportunities are endless, such as shopping malls, department stores, museums, art galleries, stadiums, office. It is contemplated that individual homes could be mapped, so that visually impaired people could get around their own house or their friends' houses easier. It could also provide warning about steps, curbs, etc. in the environment.

The concepts described herein can use and support a variety of technologies and approaches; that is, the concepts are not limited to Smartphones. It is contemplated that supermarkets, department stores, etc. could make inexpensive, dedicated devices available at the front door of their establishment so that customers could use the technology to navigate around the establishment just for the duration of their current shopping trip.

GPS-based location estimation is not extremely accurate indoors (although near a window it can be fairly accurate). Wireless-fidelity (WiFi) based location technologies, cell-tower technologies, and other similar technologies sometimes work very well indoors, but also can be inaccurate.

In order to solve such problems, a positioning system uses a combination of technologies in an indoor space. The use of a global positioning system and indoor sensors with position detection ensures obtaining of a location accuracy level of 1 m to 3 m. While most users are not aware of the locations of the sensors 25 installed for the purpose of radio communication, the locations are included in the electronic map 13 so the processor of the mobile handheld device 30 can determine the location of a user. By obtaining positional information from multiple sensors 25 (each of which may rely upon a different and/or more advanced technology for determining its location), the physical location of the user as he or she moves through the indoor environment is continually refined and improved. The sensors 25 may be dedicated wireless transceivers that receive a wireless signal only from the mobile handheld device 30 and provide a location signal only to the processor of the mobile handheld device 30.

According to another embodiment herein, a method of providing assistance to users in navigating indoor locations is disclosed. The method comprises using a handheld device having a wireless positioning system to establish a current physical location of a user with respect to a map of an indoor location stored within the handheld device. A destination location within the indoor location selected by the user is received by the handheld device. Output signals and directions to the destination location within the indoor location are provided to the user. As the user moves through the indoor location, the wireless positioning system receives signals from at least one dedicated wireless transceiver that interacts only with the hand-held device within the indoor location to determine the user's current physical location within the indoor location. Then, each individual current physical location reading is processed to refine the current physical location of the user's location in the indoor location with respect to the electronic map.

The embodiments herein help to continually refine the identification of the physical location of the mobile handheld device 30 by receiving continual inputs from many different sensors 25. More specifically, as shown in flowchart form in FIG. 2, one embodiment herein establishes a current physical location of a user with respect to a map of an indoor location in item 100. This step can be performed, for example, by a handheld device having a wireless positioning system and an electronic map of an indoor location stored within the handheld device In item 102, after establishing the current physical location of the user, the user selects a destination location within the indoor location and puts it in the handheld device.

Figure 2:
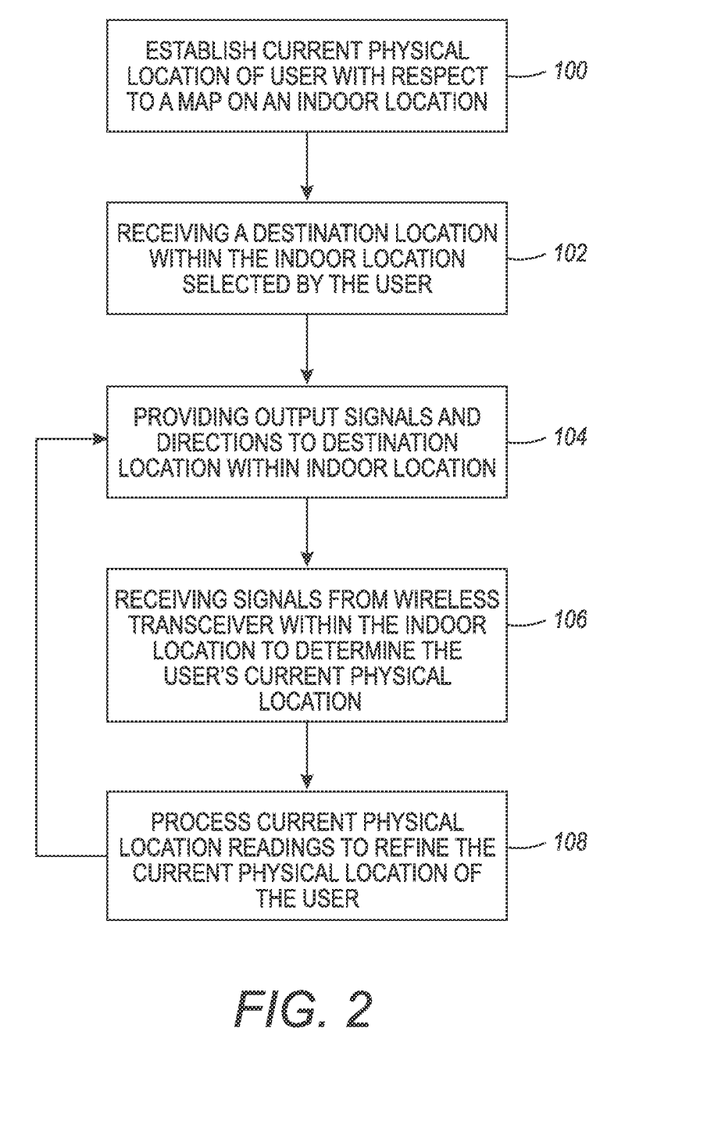
FIG. 2 is a flow diagram of a method according to embodiments herein.

As shown in item 104, output signals and directions to the destination location within the indoor location are provided to the user. Then, in item 106, as the user moves through the indoor location, the wireless positioning system receives signals only from at least one dedicated wireless transceiver within the indoor location to determine the user's current physical location within the indoor location.

In item 108, the method then processes (e.g., performs statistical operations on) the current physical location readings to refine the current physical location of the user. Each individual current physical location reading is processed to refine the current physical location of the user's location in the indoor location with respect to the electronic map. As shown by the arrow from item 108 to item 104, the processing loops back to continue to provide instructions as the user moves through the indoor location and refines the location and instructions.

Further, the embodiments herein also provide a mechanism to accommodate or adjust for errors in location detection. The position detector can provide confidence measures that are associated with their estimation location of the sensors.

Thus, in item 106, one or more of the individual current physical location readings can include a positional confidence measure. Then, when processing the individual current physical location readings in item 108, the position detector weights each individual current physical location reading by the positional confidence measure to refine the current physical position of the user.

In item 108, some embodiments herein can refine the position of the user by taking an average (or perform other statistical calculations, such as mean, standard deviation, etc.) of all positions received from the different sensors 25 that may supply it with positional information. Other embodiments herein use the physical position readings weighed by the confidence measure of the positional information. Therefore, rather than just taking a single reading to establish (or reestablish) the position of the user, the embodiments herein take an average (or some other statistical measure) of all readings that are received. These readings can also be weighted according to a number of different parameters (GPS confidence, positional distance between the sensors 25 and the mobile handheld device 30, etc.). Therefore, with embodiments herein, the location of the user is refined by each new positional reading from each new interaction with the sensors 25.

Figure 3:
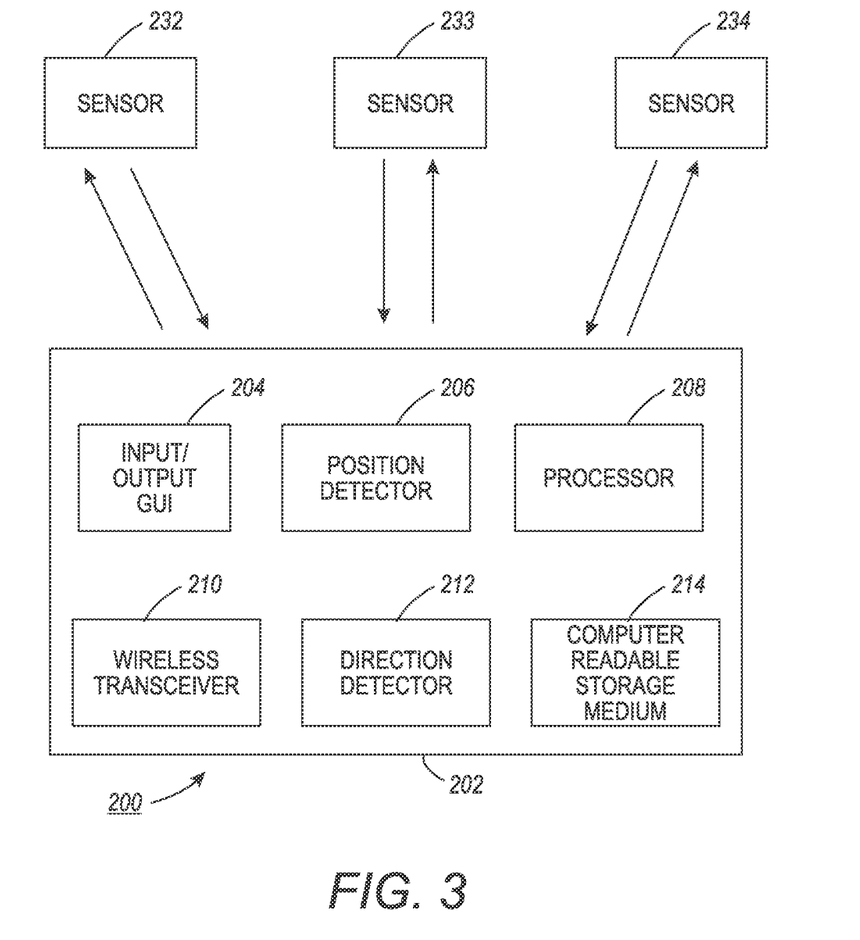
FIG. 3 is a schematic diagram of a system according to embodiments herein.

Another exemplary embodiment is shown in FIG. 3. The handheld device 200 includes a housing 202, an input/output device 204, such as a GUI (graphic user interface), a position detector 206, a processor 208, a wireless communication device 210, a direction detector 212, and a computer readable storage medium 214. The input/output device 204 may include a visual display and/or a speaker and microphone for interaction with a user. All the components within the housing 202 are operatively connected to one another, although not all connections are shown in order to avoid clutter within the drawings.

The handheld device 200 includes a wireless communication device 210 that communicates with sensor 232-234 and/or global positioning system (GPS). A position detector 206 is connected to the housing 202 and provides data of a user's location within the building. The position detector 206 receives signals from at least one sensor 232-234 within the building via the wireless communication device 210. A direction detector 212 provides data of the user's direction of motion. An input receiver of the input/output device 204 receives a destination within the building as determined by the user. A processor 208 is coupled to the position detector 206 and the direction detector 212, and the processor 208 correlates the position and direction data with information of features of the building as stored as an electronic map 300 in the computer readable storage medium 214 in the housing 202. The processor 208 establishes a physical location of the user in the building. An output of the input/output device 204 provides directions to the user. The handheld device 200 can comprise any commonly available device including, cell phones, PDAs, smart phones, portable computers, etc.

The processor 208 can establish the current physical location of the user, using the data input/output device 204, for example, when the user enters a certain location. After initially establishing the physical location of the user, the processor 208 receives, through the input/output device 204 or the wireless communication device 210, instructions for a location to travel to. The sensors 232-235 each have a physical position locator noted on an embedded electronic map 300 that corresponds to current physical position of each of the sensors 232-235.

As the user moves through the location, the processor 208 also receives, through the input/output device 204, the wireless communication device 210, etc., current physical position readings from the sensors 232-234. Each individual current physical position reading is received from each corresponding sensor when the user is within a certain distance of the sensors 232-234. As mentioned above, the processor 208 processes each individual current physical position reading to refine the current physical location of the user.

Figure 4:
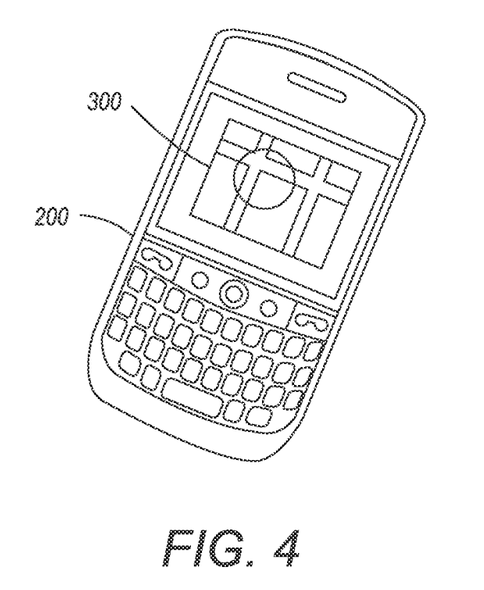
FIG. 4 is a schematic diagram of a device according to embodiments herein.

With the embodiments herein the positional information is transferred to the handheld device 200, in item 106, through the wired/wireless connection, an infrared (IR) connection, RFID, and/or GPS. FIG. 4 illustrates an exemplary portable handheld device 200 displaying a map 300 thereon.

In FIG. 4, a map 300 shows the current physical location reading of the handheld device 200. With the embodiments herein, the user would select (through the input/output device 204 or other means) the location to receive directions to.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, physical position, size, shape, angle, color, or material.

What is claimed is:

1. A system for aiding a user to navigate in an indoor facility, said system comprising:
    a handheld device carried by said user, said handheld device comprising a global positioning system (GPS);
    at least one dedicated wireless transceiver disposed in selected areas of said indoor facility that interacts only with said handheld device; and
    a processor operatively coupled to said handheld device,
        said processor establishing a current physical location of said user using said global positioning system;
        upon activation by said user, said processor downloading an electronic map of said indoor facility, said electronic map comprising a layout of said indoor facility, including each of said selected areas and locations of said dedicated wireless transceiver disposed in said each of said selected areas of said indoor facility;
        said processor receiving signals from said at least one dedicated wireless transceiver and correlating said current physical location with respect to said electronic map, said at least one dedicated wireless transceiver comprising an independent wireless positioning system;
        said processor receiving, from said user, a destination location within said indoor facility;
        said processor providing, to said user, output signals comprising voice guidance to said destination location within said indoor facility;
        as said user moves through said indoor facility, said processor receiving signals from said at least one dedicated wireless transceiver and determining an updated physical location of said user within said indoor facility;
        said processor processing each updated physical location reading and refining said updated physical location of said user and direction of travel in said indoor facility with respect to said electronic map, said refining comprising weighting said updated physical location based on GPS position confidence and said independent wireless positioning system; and
        said processor providing, to said user, output signals comprising voice guidance indicating direction and distance to said destination location within said indoor facility.

2. The system according to claim 1, said at least one dedicated wireless transceiver comprising a sensor receiving a wireless signal from said handheld device and providing a location signal to said processor.

3. The system according to claim 1, said processor further establishing said current physical location of said user with respect to said electronic map using at least one of:
   a land-based receiver;
   a cell phone based triangulation receiver; and
   a WiFi receiver.

4. The system according to claim 3, said land-based receiver using at least one of:
   infrared signals; and
   radio-frequency identification (RFID).

5. The system according to claim 1, said processor performing statistical operations to refine said updated physical location of said user.

6. A handheld system for aiding a visually impaired user to navigate within a building, comprising:
   a housing;
   a first position detector connected to said housing providing data of a location of a user with respect to said building;
   a second position detector connected to said housing providing data of a location of said user within said building, said second position detector receiving signals from at least one dedicated wireless transceiver that interacts only with said second position detector within said building, said second position detector being independent of said first position detector;
   a memory in said housing storing an electronic map comprising an interior layout indicating features of said building;
   a direction detector providing data of direction of motion of said user;
   an input receiver receiving a destination within said building as determined by said user;
   a processor coupled to said first position detector, said second position detector and said direction detector, said processor using said first position detector and said second position detector to establish a physical location of said user in said building with respect to said electronic map, said processor correlating location data from at least said second position detector and direction data from said direction detector with information of said features of said building and determining an updated physical location of said user in said building, said processor refining said updated physical location based on weighted confidence measures of positional information from said first position detector and said second position detector; and
   an output device providing voice guidance to said user indicating direction and distance to said destination within said building as determined by said user.

7. The handheld system according to claim 6, said at least one dedicated wireless transceiver comprising a sensor receiving a wireless signal from said second position detector and providing a location signal to said processor.

8. The handheld system according to claim 6, said first position detector comprising one of:
   a global positioning system (GPS);
   a land-based receiver;
   a cell phone based triangulation receiver; and
   a WiFi receiver.

9. The handheld system according to claim 8, said land-based receiver using at least one of:
   infrared signals; and
   radio-frequency identification (RFID).

10. The handheld system according to claim 6, said features of said building comprising:
    walkways;
    doors;
    rooms;
    stairways; and
    elevators.

11. The handheld system according to claim 6, said processor providing a list of at least one of destinations and features within said building to said user, and
    said input receiver enabling selection, by said user, of at least one of said destinations and features within said building.

12. The handheld system according to claim 6, said input receiver receiving at least one of voice commands and tactile input.

13. The handheld system according to claim 6, further comprising:
    said output device providing directions by visual display on a screen connected to said housing.

14. A method of providing assistance to users in navigating indoor locations comprising:
    using a handheld device having a first positioning system and an independent wireless positioning system, establishing a current physical location of a user with respect to a map of an indoor location stored within said handheld device by correlating a position established by said first positioning system with a position established by said independent wireless positioning system;
    receiving, by said handheld device, a destination location within said indoor location selected by said user;
    providing, to said user, output signals comprising voice guidance to said destination location within said indoor location;
    as said user moves through said indoor location, said independent wireless positioning system receiving signals from at least one dedicated wireless transceiver that interacts only with said handheld device within said indoor location and determining an updated physical location of said user within said indoor location;
    processing each individual updated physical location reading and refining said updated physical location of said user and direction of travel in said indoor location with respect to said map, said refining said updated physical location being based on weighted confidence measures of positional information from said first positioning system and said independent wireless positioning system; and
    providing, to said user, output signals comprising voice guidance indicating direction and distance to said destination location within said indoor location.

15. The method according to claim 14, further comprising downloading an electronic version of said map of said indoor location.

16. The method according to claim 14, said current physical location being established by said handheld device using said first positioning system comprising at least one of:
    a global positioning system (GPS);
    a land-based receiver;
    a cell phone based triangulation receiver; and
    a WiFi receiver.

17. The method according to claim 14, said processing each individual updated physical location reading comprising correlating position data and direction data with information of features of said indoor location associated with said map in a memory in said handheld device.

18. The method according to claim 17, said features of said indoor location comprising:
walkways;
doors;
rooms;
stairways; and
elevators.

19. The method according to claim 14, said receiving, by said handheld device, a destination location within said indoor location selected by said user comprising:
receiving at least one of voice commands and tactile input.

20. The method according to claim 14, further comprising:
providing directions to said destination location within said indoor location by a visual display on a screen connected to said handheld device.

\* \* \* \* \*